(12) United States Patent
Fabre et al.

(10) Patent No.: US 9,353,559 B2
(45) Date of Patent: May 31, 2016

(54) LATCHING SYSTEM FOR SECURING TWO COMPONENTS

(71) Applicant: AIRBUS OPERATIONS SAS, Toulouse (FR)

(72) Inventors: Christian Fabre, Tournefeuille (FR); Alain Bignolais, Léguevin (FR)

(73) Assignee: Airbus Operations (SAS), Toulouse (FR)

( * ) Notice: Subject to any disclaimer, the term of this patent is extended or adjusted under 35 U.S.C. 154(b) by 93 days.

(21) Appl. No.: 14/258,822

(22) Filed: Apr. 22, 2014

(65) Prior Publication Data
US 2015/0300061 A1    Oct. 22, 2015

(51) Int. Cl.
| E05C 5/00 | (2006.01) |
| E05C 19/14 | (2006.01) |
| B64D 29/06 | (2006.01) |
| F02C 7/20 | (2006.01) |

(52) U.S. Cl.
CPC .............. *E05C 19/145* (2013.01); *B64D 29/06* (2013.01); *F02C 7/20* (2013.01)

(58) Field of Classification Search
CPC .............. B64D 29/06; Y10T 292/0917; Y10T 292/0871; Y10T 292/0911; E05C 19/145; E05C 19/14; E05C 3/08; E05C 19/10; Y10S 292/31; Y10S 292/49
USPC .......................................... 292/113
See application file for complete search history.

(56) References Cited

U.S. PATENT DOCUMENTS

| 3,347,578 A * | 10/1967 | Sheehan ................ B64D 29/06 244/54 |
| 4,053,177 A * | 10/1977 | Stammreich .......... E05C 19/145 292/113 |
| 4,679,750 A * | 7/1987 | Burhans ................ B64D 29/06 244/129.4 |
| 4,858,970 A * | 8/1989 | Tedesco ................ E05C 19/145 292/109 |
| 5,620,212 A * | 4/1997 | Bourne .................. B64D 29/06 292/113 |
| 6,279,871 B1 * | 8/2001 | Ogura ................... F16K 31/007 251/129.06 |
| 6,343,815 B1 * | 2/2002 | Poe ........................ E05C 19/145 292/113 |
| 2011/0171019 A1 | 7/2011 | Provost |
| 2011/0227350 A1 | 9/2011 | Do |

FOREIGN PATENT DOCUMENTS

| DE | 9011442 U1 | 10/1990 |
| DE | 9016416 U1 | 2/1991 |
| DE | 9211947 U1 | 2/1993 |
| DE | 102006043583 A1 | 3/2008 |
| EP | 0431769 A2 | 6/1991 |
| FR | 1528891 A | 6/1968 |
| FR | 2920169 A1 | 2/2009 |

OTHER PUBLICATIONS

French Search Report, Nov. 21, 2013.

* cited by examiner

*Primary Examiner* — Mark Williams
(74) *Attorney, Agent, or Firm* — Greer, Burns & Crain, Ltd.

(57) ABSTRACT

A latching system for selectively securing together two components, such as the fan cowl doors of a nacelle of an aircraft, closed. The latching system generally includes an anchor and a latch. The latch has a handle movable from an open and a closed position. The handle is precluded from reaching the closed position unless the anchor and latch are secured. Also, the positioning of a keeper portion of the anchor may be adjustable.

18 Claims, 18 Drawing Sheets

LATCHING SYSTEM FOR SECURING TWO COMPONENTS

FIELD OF THE INVENTION

The present invention relates to a latching system for securing together two components, and more specifically to a latching system for securing together and closing the fan cowl doors of an aircraft nacelle.

BACKGROUND OF THE INVENTION

An aircraft having an engine supported in the airframe mounted configuration comprises an engine and a nacelle structure housing said engine. The nacelle structure comprises two displaceable parts called fan cowl doors or cowlings which can be opened on the ground during maintenance operations to access the various items of the engine. The cowlings or fan cowl doors are closed and properly latched during operational conditions of the aircraft, providing aerodynamic continuity for the engine during flight. The cowls doors are typically hinged to the top of the nacelle so that they can rotate upwardly or downwardly relative to the nacelle and are arranged symmetrically on different sides of a mast or a pylon on which the nacelle is suspended to a wing of the aircraft.

The nacelle usually also comprises fan cowl doors latching systems fixing and latching the fan cowl doors during operation of the aircraft.

These latching systems are used to secure the two cowl doors together in the closed position. Typically, the two cowl doors are held together with a plurality of latching systems. Each latching system usually has an anchor (also sometimes referred to as a keeper) provided at a lower edge of a first cowl door, and a latch provided at a lower edge of a second cowl door. The latch has, among other portions, a hinged hook for coupling to the anchor, and a handle. Such a latch is known from, for example, U.S. Pat. No. 4,531,769.

The latching system is able to occupy two states. In a first state the hook is coupled to the anchor and the latching system maintains the cowl doors in a closed position. If the handle is in a closed position, the latching system is supposed to be closed and the cowl doors are supposed to be secured and closed.

The second state of the latching system is one in which the hook is uncoupled from the anchor and thus, the cowl doors are not secured to each other or maintained in a closed position. Typically, in this state the handle is in the open position and hangs down underneath the cowl doors providing a visual indication that the cowl doors are not secured and/or in the closed position.

However in conventional latching systems, it is possible for the handle to move to the closed position even if the cowl doors are not secured to each other. Thus, while the handle may be in the closed position, the cowl doors may not be secured together in the closed position. Therefore, the handle cannot effectively function as a visual indicator that the cowl doors are not secured together.

Indeed, it is important to verify that the latching systems are each secured and locked before the take-off of the aircraft. If the cowl doors are in the closed position, but not secured together (i.e., having unsecured latching systems), they can be ejected from the aircraft due to the air pressure during the flight.

Furthermore, under its own weight, and because of the position of its pivot axis, a cowl door tends to rotate downward to a resting position similar to its closed position. This may make it difficult for an operator to visually determine if the cowl doors are actually secured together and fully closed by the latching system, or merely "resting."

Moreover, there is a current trend towards the utilization of aircraft engines that include a high bypass ratio and have a fan diameter between 3-4 meters. The use of such large engines decreases the ground clearance of the nacelle. Accordingly, it can be very difficult for an operator to visually verify if the cowl doors are secured and closed by inspecting the handles of the latching systems.

Therefore, there is a need for a latching system that addresses these concerns.

SUMMARY OF THE INVENTION

In an embodiment of the present invention, a latching system is provided for selectively securing a first cowl door with a second cowl door. The latching system includes an anchor secured to the first cowl door and a latch secured to the second cowl door. The latch includes a handle moveable from a closed position to an open position. The latch further includes a gripping arm having a first end configured to couple to the anchor in order to secure the latch to the anchor. The handle is only moveable to the closed position only when the gripping arm of the latch is secured to the anchor.

It is contemplated that the latching system also includes a biasing element for biasing the gripping arm. In some embodiments the biasing element biases the gripping arm to a position in which the gripping arm of the latch is unsecured to the anchor. It is also contemplated that the handle is further only movable to the closed position when additionally a force exerted by the biasing element is overcome. The biasing element may also be configured to preclude the handle from moving to the closed position unless the latch is secured to the anchor.

It is further contemplated that the latching system also includes a frame having a first aperture, a first end, and a second end. The first end of the frame is preferably pivotably connected to a first end of the handle. The second end of the frame slideably receives the gripping arm of the latch.

The latching system may also include an actuating member disposed in the handle. The actuating member includes a post configured to extend though the first aperture of the frame. More specifically, the post only extends through the first aperture of the frame while the handle is being moved to the closed position if the gripping arm of the latch is secured to the anchor. It is contemplated that the post of the actuating member includes a head which is configured to selectively lock the handle in the closed position.

It is also contemplated that the latching system further includes a bracket secured to a second end of the gripping arm of the latch. The bracket includes a second aperture. In such a case, the post may only extend through the first aperture of the frame and the second aperture of the bracket if they are aligned while the handle is being moved to the closed position if the gripping arm of the latch is secured to the anchor.

It is further contemplated that the first aperture of the frame and the second aperture of the bracket are biased to be misaligned. Therefore, the latching system may include a biasing element. The biasing element may be at least one conical spring washer, a compression spring, a compressed gas piston, an elastomer part, a hydraulic piston, or any other similar biasing element. The latching system may also include a tube disposed within the frame. The tube has a closed end and an open end. The closed end of the tube may be secured to the bracket. The open end of the tube may contain a housing that is movable relative to the tube. The housing may also be secured to the second end of the frame.

Furthermore, the gripping arm of the latch may also include a flange disposed between the first end of the gripping arm and the second end of the gripping arm. The flange of the gripping arm of the latch may be disposed within the housing.

It is contemplated that the biasing element is disposed within the tube between the closed end of the tube and the housing. The biasing element may bias the first aperture of the frame and the second aperture of the bracket into misalignment.

In one or more embodiments, the anchor of the latching system includes a keeper and a mounting. The keeper is configured to couple to the first end of the gripping arm of the latch. The mounting secures the anchor to the first cowl.

It is contemplated that the latching system also includes a shaft which secures the keeper of the anchor to the mounting of the anchor. A distance between the keeper of the anchor and the mounting of the anchor in a direction along an axis of the shaft may be selectively adjustable.

It is further contemplated that an adjustment mechanism for adjusting a distance between the keeper of the anchor and the mounting of the anchor in a direction along an axis of the shaft is provided. The adjustment mechanism may include an aperture with a threaded outer surface configured complementarily to a threaded portion of the shaft.

In one or more embodiments, the anchor of the latching system includes a first notched portion and a second notched portion. The first notched portion of the anchor is configured to couple to the first end of the gripping arm of the latch when the handle is being moved to the closed position to transmit a closing force from the gripping arm to the anchor in a closing direction. The second notched portion of the anchor is configured to couple to the first end of the gripping arm of the latch only when the handle is being moved to the open position to transmit an opening force from the gripping arm to the anchor in an opening direction, oppositely orientated from the closing direction.

One or more of the disclosed embodiments provides a device wherein the latching system cannot fully close unless the gripping arm and the anchor are coupled together. Thus, if the two are uncoupled, the handle will remain in at least a partially open position, making it easier to visually determine if the latching system is indeed properly closed—and thus if the cowl doors are secured together and fully closed.

Furthermore, one or more of the embodiments of the present invention provides a latching system that ensures application of a nominal clamping stress between the two cowl doors. If the appropriate force is not present because the latching system is not properly secured, the latching system cannot be fully closed. Such a latching system further increases the ability to visually determine the status of the latching system as well as the two cowl doors.

Additionally, one or more of the disclosed embodiments provides a device with an actuating member that locks the handle in the closed position. This is believed to be beneficial and desirable because it ensures that the cowl doors are properly closed and locked under a nominal stress of clamping during the phases of flight and that the handle will not open and the latch will not decouple from the anchor until the actuating member is released.

Finally, one or more of the disclosed embodiments provides a latching system with an anchor having two portions configured to couple to the gripping arm. It is believed that such a design, along with a movement of the handle and pivot arms, better facilitates separation of the two cowl doors and allows for easier opening and closing of the cowl doors for light maintenance operations without the use of inappropriate tools that may damage the cowl doors or other systems and related components.

It is to be understood that the aspects of the present invention described above may be combinable and that other advantages and aspects of the present invention will become apparent upon reading the following description of the drawings and detailed description of the preferred embodiments.

BRIEF DESCRIPTION OF THE DRAWINGS

The figures in the appended drawings will make it possible to understand how the invention can be produced. In these figures, identical reference numbers denote similar elements.

DETAILED DESCRIPTION OF THE PREFERRED EMBODIMENTS

Figure 1A:
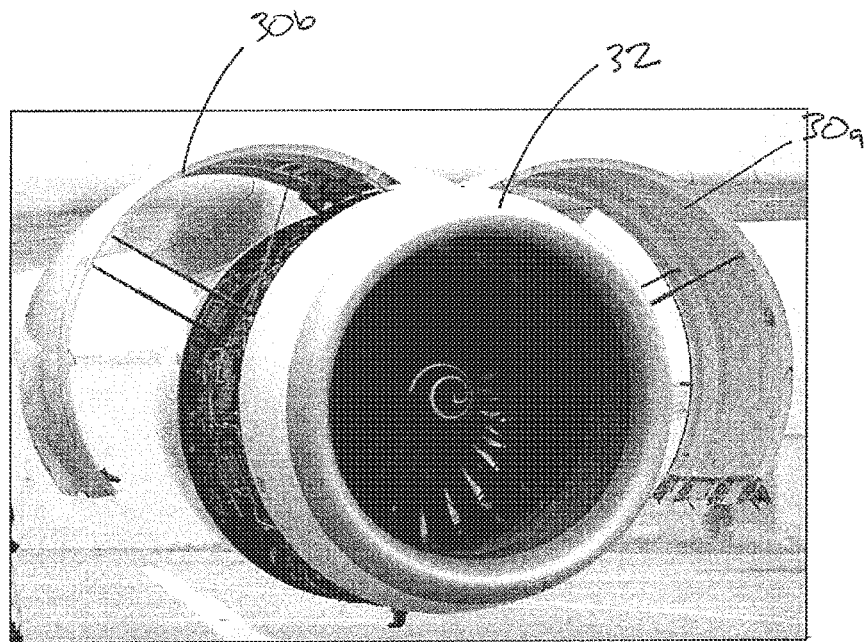
FIG. 1A is a front and side perspective view of an aircraft nacelle with fan cowl doors in an open position and FIG. 1B is front view of an aircraft nacelle with fan cowl doors in a closed position.

While this invention is susceptible of embodiment in many different forms, there is shown in the drawings and will herein be described in detail one or more embodiments with the understanding that the present disclosure is to be considered as an exemplification of the principles of the invention and is not intended to limit the invention to the embodiments illustrated.

Figure 1B:
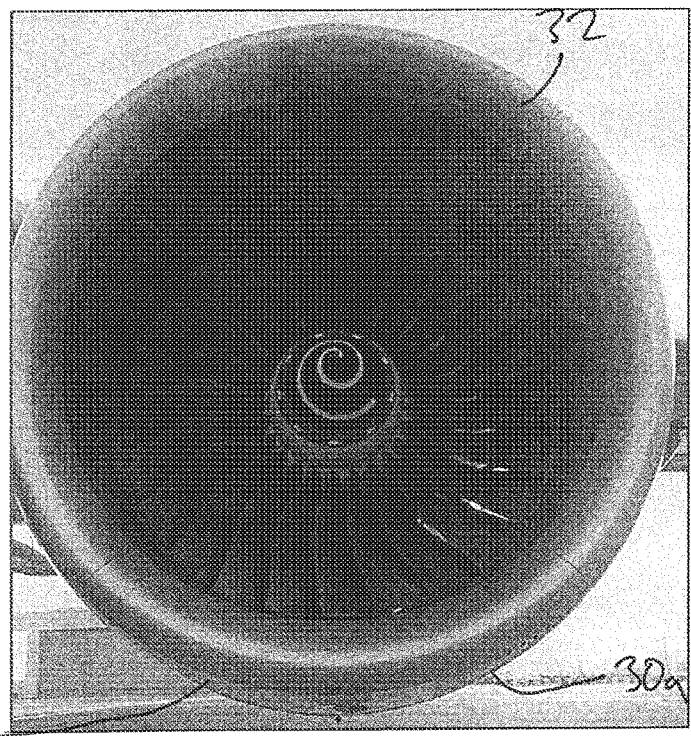

With reference to FIGS. 1A and 1B, the present invention is preferably used for selectively securing two components, such as fan cowl doors 30a, 30b of a nacelle 32, in a closed position (shown in FIG. 1A in an opened position and shown in FIG. 1B in a closed position).

Figure 2:
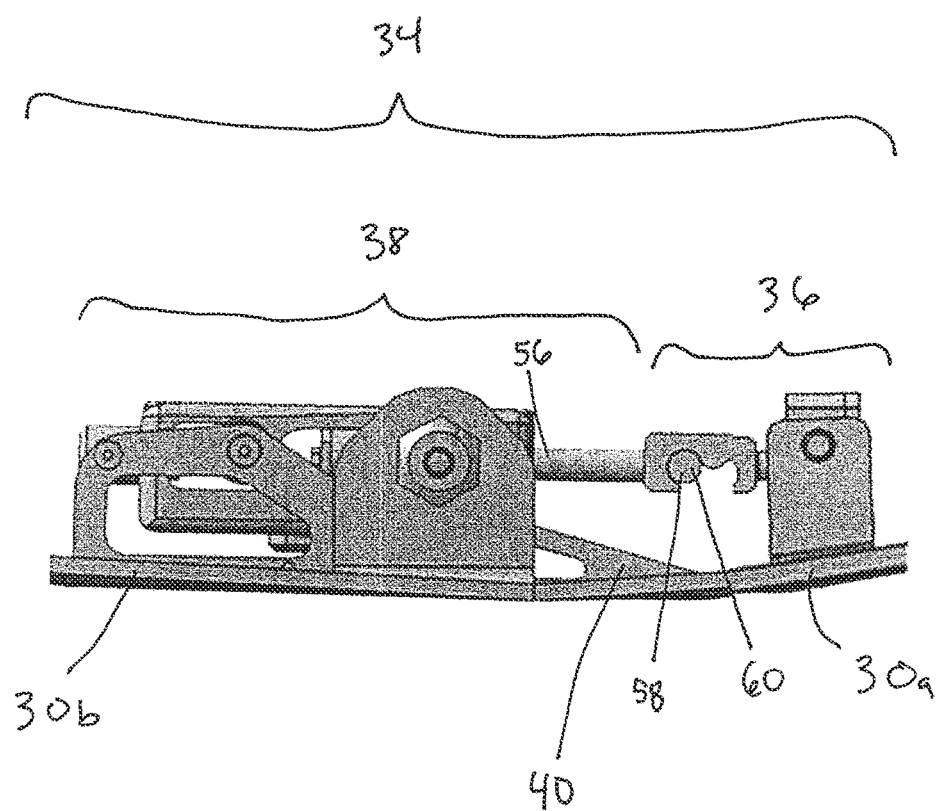
FIG. 2 is a side elevated view of a latching system according to one or more embodiments of the present invention, the latching system being shown in a closed position and closing two fan cowl doors together.

As can be seen in FIG. 2, a latching system 34 according to one or more embodiments of the present invention includes an anchor 36 mounted to the first cowl door 30a and a latch 38 mounted to the second cowl door 30b. Of course, the latching system 34 could also be used in other environments to secure two separate components together.

Figure 3:
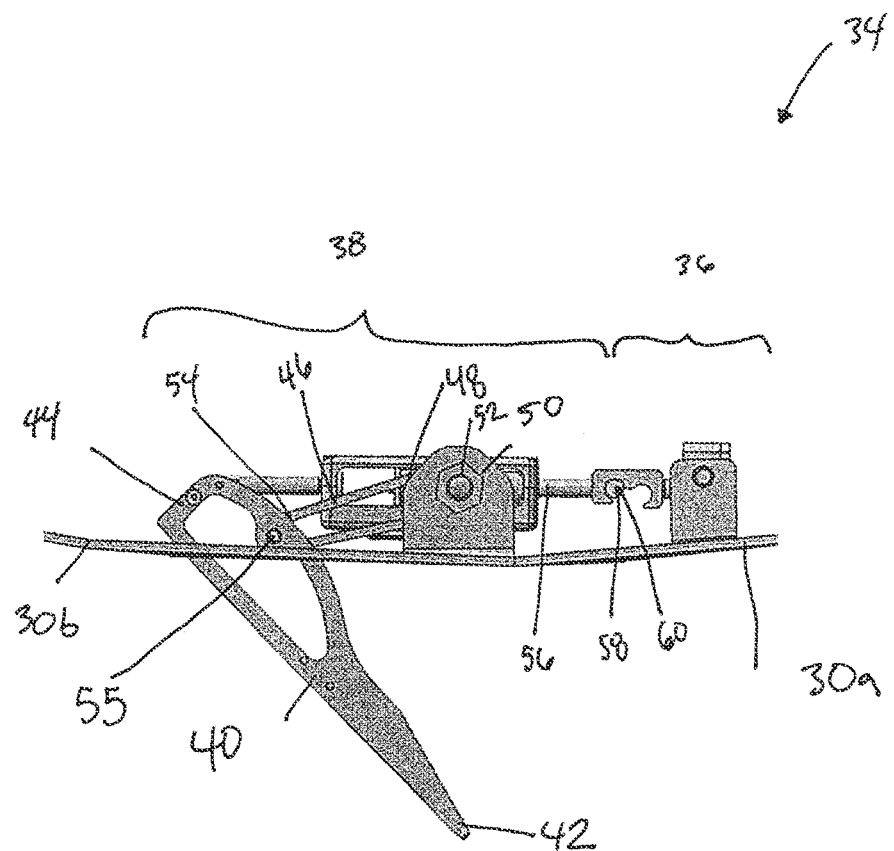
FIG. 3 is a side elevated view of a latching system according to one or more embodiments of the present invention, the handle not fully closed.

Turning to FIG. 3, the latch 38 includes a handle 40 moveable from an open position (FIG. 3) to closed position (FIG. 2). As shown in FIG. 3, in a preferred embodiment, the handle 40 has a first end 42 and a second end 44. The first end 42 of the handle 40 may be gripped and operated to move the handle 40 from the open position to the closed position, as well as from the closed position to the open position.

In order to control the movement of the handle 40 between the open position and the closed position, the latch 38 also may include two pivot arms 46. See, FIG. 4. As will be appreciated by one of ordinary skill in the art, FIG. 3 only shows a side view of the latching system 34, and thus only shows one pivot arm 46. Therefore, the present description will only make reference to one pivot arm 46; however, it should be understood that two pivot arms 46, one on each side of the latch 38, are present in various embodiments of the present invention.

Figure 4:
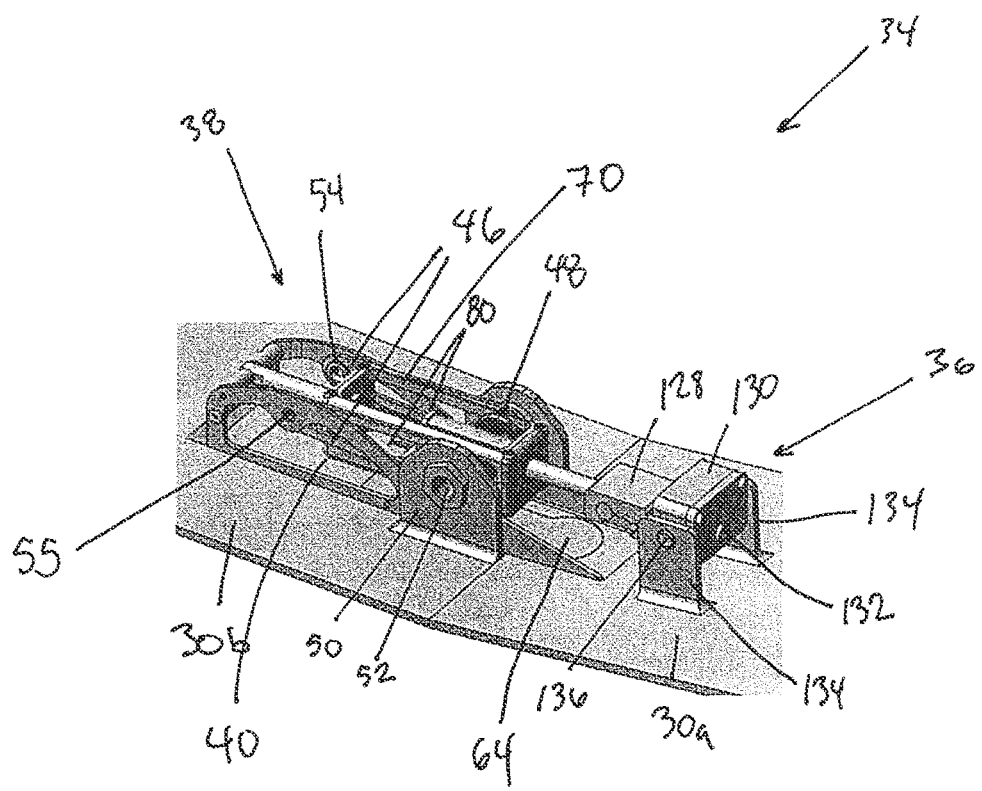
FIG. 4 is a top and side perspective view of a latching system according to one or more embodiments of the present invention, the latching system shown in a closed position.

As shown in FIGS. 3 and 4, a pivot arm 46 has a first end 48 mounted to the second cowl door 30b. It is contemplated that the first end 48 of the pivot arm 46 is secured to the second cowl door 30b with a mounting 50 and a fastener 52, which acts as a pivot axis. A second end 54 of the pivot arm 46 is pivotably connected to the handle 40 at pivot axis 55, preferably at a position between the first end 42 of the handle 40 and the second end 44 of the handle 40. The movement of the pivot arm 46 will be discussed in more detail below regarding the opening and closing of latching system 34.

As shown in, for example, FIGS. 2 and 3, the latch 38 further includes a gripping arm 56 which has a portion 58 configured to couple to the anchor 36 to secure the latch 38 to the anchor 36. This, in turn, will secure (or couple) the cowls 30a, 30b together. Preferably, a first end 60 of the gripping arm 56 is configured to couple to the anchor 36, and most preferably, the first end 60 of the gripping arm 56 is t-shaped.

According to the present invention, and as will be described in more detail below, if the gripping arm 56 is not secured to the anchor 36, the handle 40 will not move to the closed position. Thus, the first end 42 of the handle 40 will hang underneath the cowl doors 30a, 30b, providing a visual indication that the latch 38 and the anchor 36 (and thus the cowl doors 30a, 30b) are not coupled together or are not fully closed.

Figure 5:
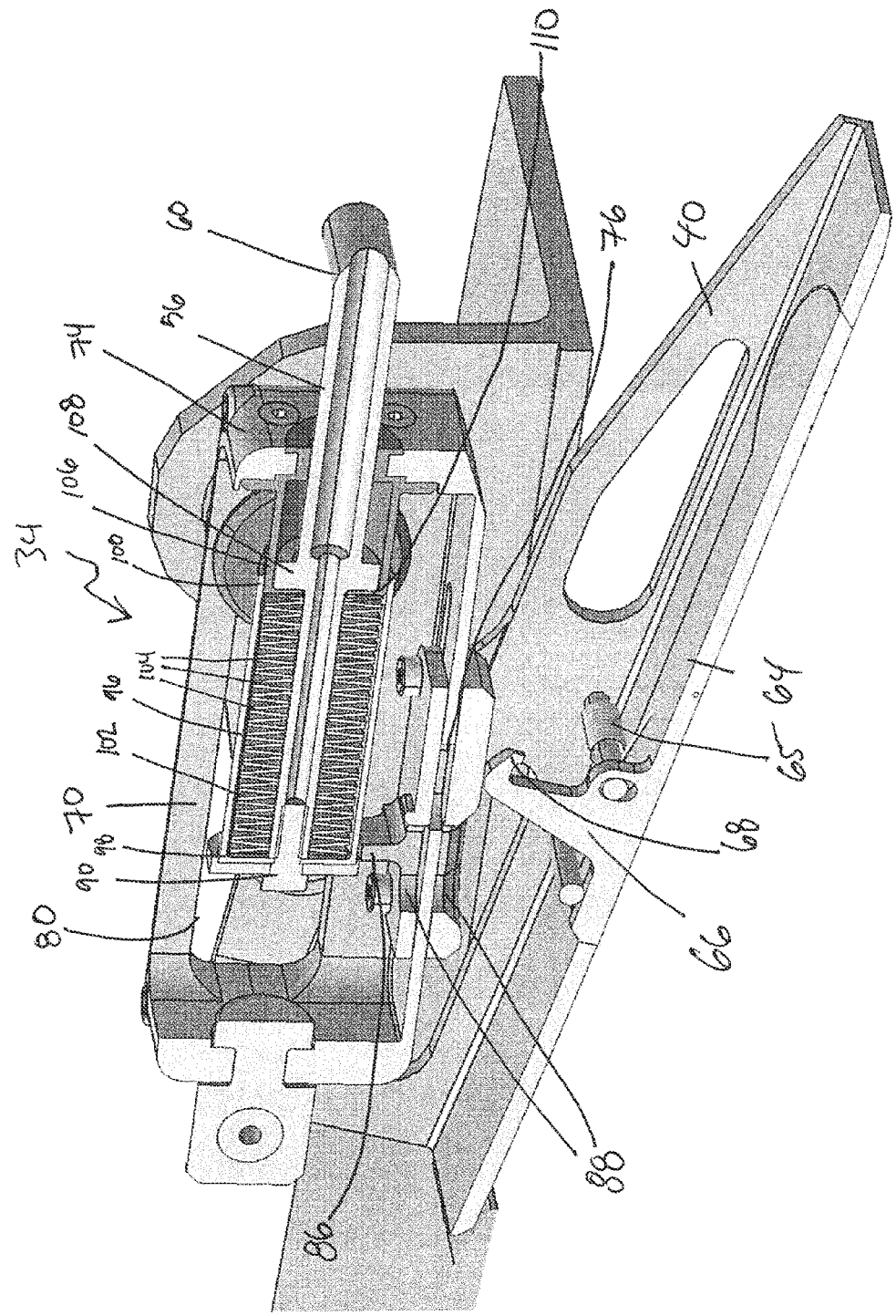
FIG. 5 is a side and front cutaway view of a latch used with a latching system according to one or more embodiments of the present invention, wherein the handle is not capable of being fully closed.

As can be seen in FIG. 5, the latching system 34 preferably includes an actuating member 64 that is preferably permanently attached to the handle 40. The actuating member 64 includes a post 66 with a head 68. If the gripping arm 56 is not secured to the anchor 36, the head 68 of the post 66 of the actuating member 64 will preclude the handle 40 from being fully moved to the closed position because of interference between the post 66 and some other element (discussed below).

Thus, if the latching system 34 is not fully engaged in a securing manner, the handle 40 will be precluded from moving into a closed position, thereby hanging underneath the cowl doors 30a, 30b and giving a clear visual indication that the latch 38 is not secured to the anchor 36.

Figure 6:
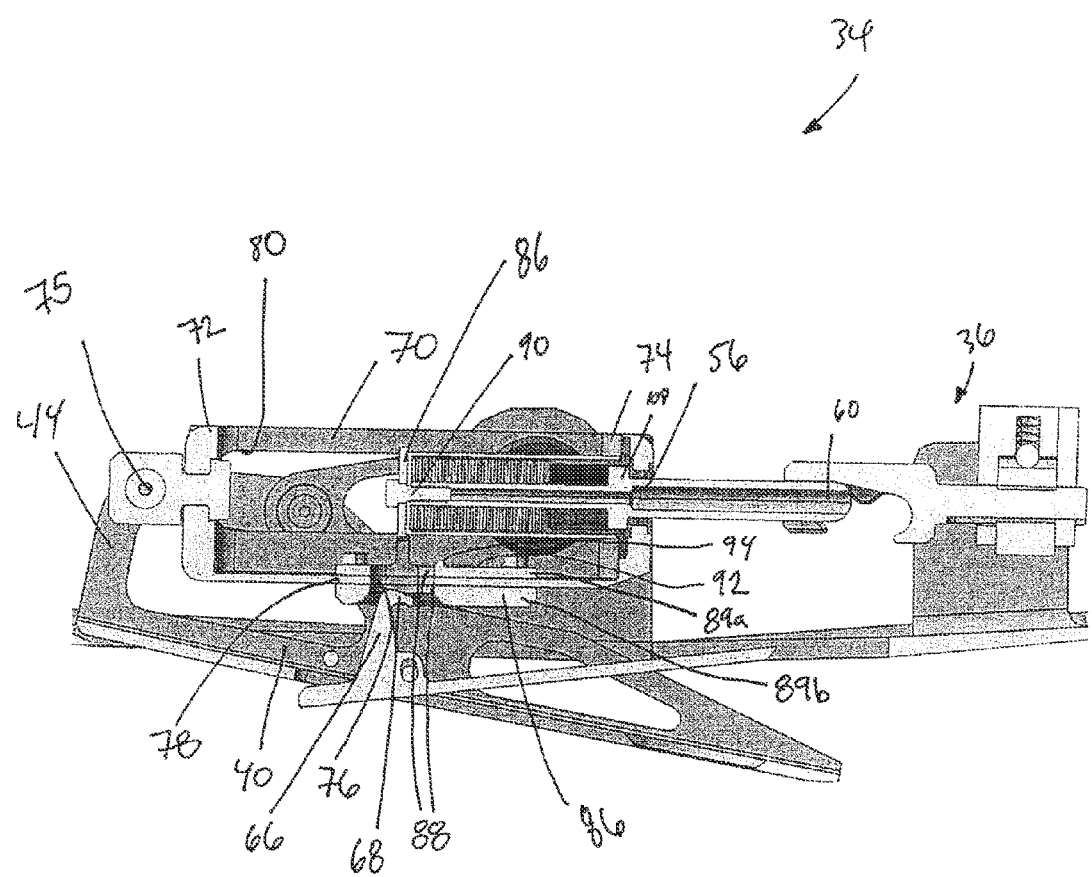
FIG. 6 is a side cutaway view of a latching system according to one or more embodiments of the present invention, wherein the handle is capable of being fully closed.

In a preferred embodiment, as shown in FIG. 6 the latching system 34 includes a frame 70. The frame 70 includes a first end 72 and a second end 74. The first end 72 of the frame 70 is pivotably connected at pivot axis 75 to the second end 44 of the handle 40. The second end 74 of the frame 70 may slideably receive the gripping arm 56. Additionally, an aperture 76 is preferably disposed in a bottom 78 of the frame 70.

Returning to FIG. 4, the frame 70 may also be mounted to the second cowl door 30b. Accordingly, the frame 70 may include two slots 80 on opposing sides of the frame 70. Each of the slots 80 extends in a direction generally parallel to a longitudinal axis of the frame 70. Passing through each slot 80 is the fastener 52. Each of the fasteners 52 may attach to the second cowl door 30b via the mounting 50 used to secure the pivot arms 46. In this manner, the frame 70 is slideably mounted to the second cowl door 30b. Since the frame 70 is slideably mounted, it is capable of moving longitudinally during the movement of the handle 40.

As can be seen in FIG. 6, the latching system 34 also preferably includes a bracket 86 having an aperture 88 and being secured to a second end 90 of gripping arm 56. As shown, the bracket 86 includes two elements 89a, 89b both of which are secured to the bottom 78 of the frame 70. The first element 89a is disposed inside of the frame. The second element 89b is disposed outside of the frame 70. Accordingly, the aperture 88 of the bracket 86 exists both above and below the aperture 76 of the frame 70. Other configurations are contemplated in which the bracket 86 includes only one piece, such that the aperture 88 of the bracket 86 exists only above or below the aperture 76 of the frame 70.

It is preferred that an upper top surface 92 of the inner element 89a of the bracket 86 includes a protrusion 94 adjacent to the aperture 88 for cooperating with the head 68 of the actuating member 64 to lock the handle 40 in the closed position (discussed below with respect to FIG. 7).

As shown in FIG. 6, the post 66 of the actuating member 64 will only pass through the aperture 76 of the frame 70 and the aperture 88 of the bracket 86 when the gripping arm 56 is secured to the anchor 36. If, for example, the gripping arm 56 has not been secured to the anchor 36, the apertures 76, 88 will not align, and the post 66 will be precluded from passing through at least one of the apertures 76, 88, and preferably both apertures 76, 88. See, FIG. 5. It will be appreciated that the post 66 only needs to be precluded from passing through one of the two apertures 76, 88 in order to prohibit the handle 40 from closing.

In a most preferred embodiment, the frame 70 and the bracket 86 are biased in opposite directions such that the aperture 76 of the frame 70 and the aperture 88 of the bracket 86 are biased to misalign.

Accordingly, as shown in FIG. 5, a tube 96 may be provided which includes a closed end 98 secured to the bracket 86, an open end 100, and a biasing element 102 disposed between the closed end 98 and the open end 100. A preferred biasing element 102 includes a plurality of "Belleville" spring washers 104 (also known as a conical spring washer). Other biasing elements 102 are contemplated, including for example, a compression spring, compressed gas, an elastomer part, a hydraulic piston, or any other similar biasing element. It is also contemplated that the handle 40 is further only movable to the closed position when additionally a force exerted by the biasing element 102 is overcome. The biasing element 102 may also be configured to preclude the handle 40 from moving to the closed position unless the latch 38 is secured to the anchor 36.

Slideably received in the open end 100 of the tube 96 is a housing 106. The housing 106 is secured to the second end 74 of the frame 70. Disposed inside of the housing 106 is preferably a flange 108 on the gripping arm 56 located between the first end 60 of the gripping arm 56 and the second end 90 of the gripping arm 56. See, FIG. 6.

As shown in FIG. 5, the biasing element 102 exerts a force against a bottom 110 of the housing 106 and against the closed end 98 of the tube 96. If the portion 58 of the gripping arm 56 is not secured to the anchor 36, the housing 106 and the closed end 98 of the tube 96 will be moved apart in opposite directions because of the force exerted by the biasing element 102. Since the housing 106 is secured to the frame 70 and since the bracket 86 is secured to the tube 96, the movement of the housing 106 relative to the tube 96 translates to a relative movement between the frame 70 and the bracket 86.

Consequently, the movement between the frame 70 and the bracket 86 will cause the aperture 76 of the frame 70 and the aperture 88 of the bracket 86 to become misaligned. If the apertures 76, 88 are misaligned, the post 66 of the actuating member 64 cannot pass through at least one of the apertures 76, 88, and preferably both. Therefore, the actuating member 64 will preclude the handle 40 from reaching its fully closed position because of the misalignment of the aperture 76 of the frame 70 and the aperture 88 of the bracket 86. If, however, the two apertures 76, 88 are aligned, the post 66 can enter, and the handle 40 can be fully closed. See, FIG. 6.

Turing to FIGS. 7-14, the opening of a fully closed latching system 34 will now be described.

Figure 7:
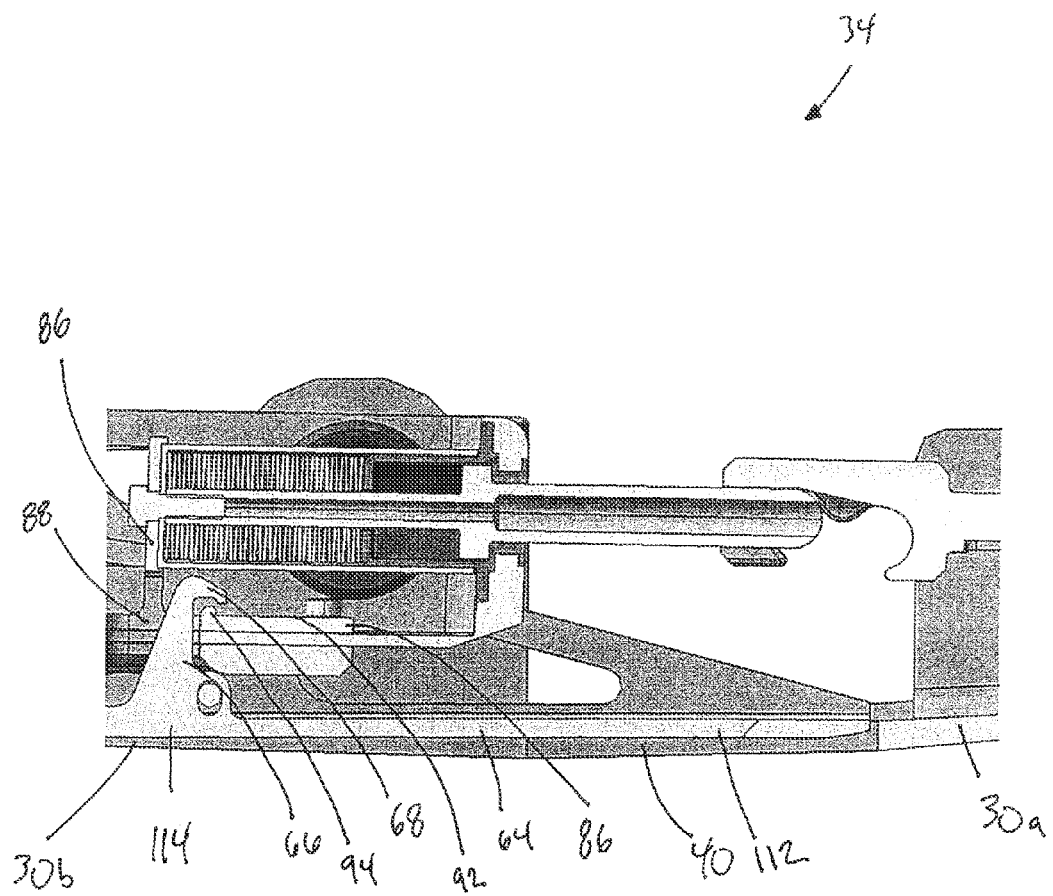
FIG. 7 is another side cutaway view of a latch used with a latching system according to one or more embodiments of the present invention, the latching system shown in a closed position.

As shown in FIG. 7, in this embodiment, the head 68 of the post 66 of the actuating member 64 is coupled to the protrusion 94 on the upper top surface 92 of the bracket 86. Accordingly, the handle 40 is locked in the closed position.

Figure 8:
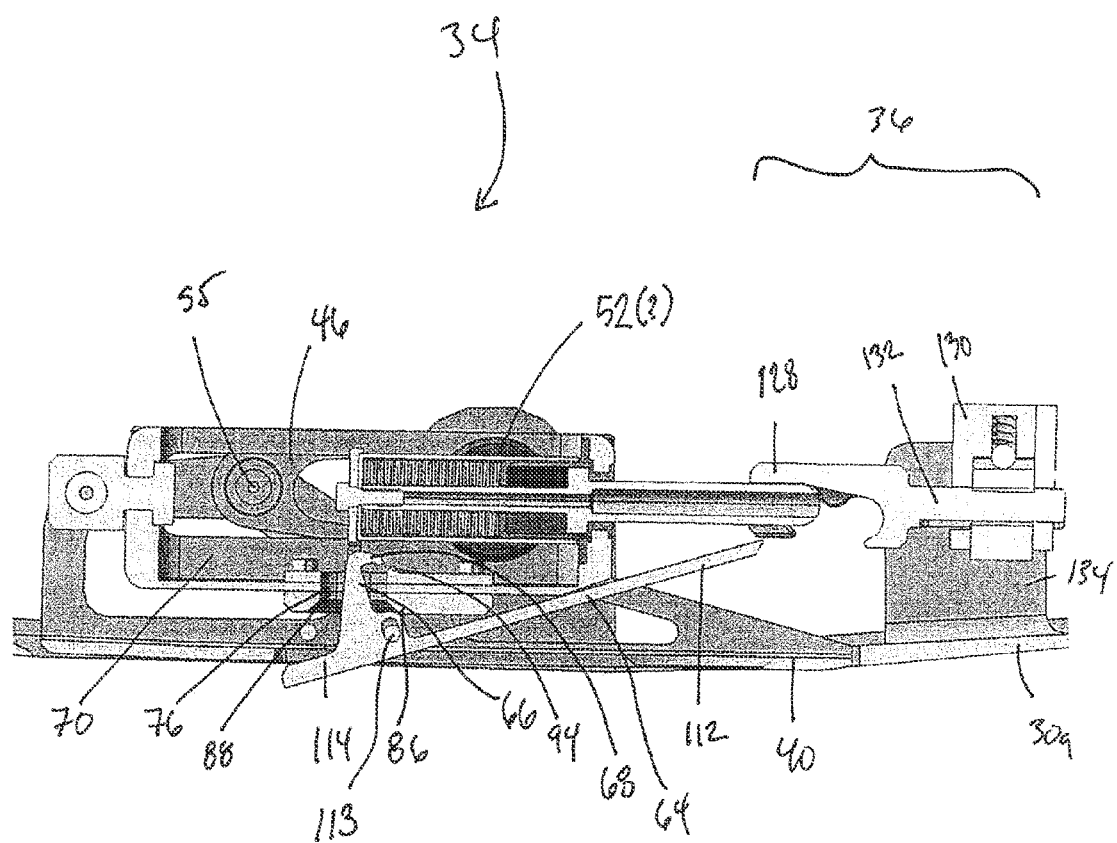
FIG. 8 is another side cutaway view of a latching system according to one or more embodiments of the present invention, the latching system shown in an initial opening sequence.

As shown in FIG. 8, a user first upwardly depresses a first portion 112 of the actuating member 64, which is pivotally mounted to handle 40 at post 113, which will pivot downward a second portion 114 of the actuating member 64 which includes the post 66. As the head 68 of the post 66 disengages the protrusion 94, the handle 40 becomes unlocked, and can be pivoted in a clockwise direction (as shown in the drawings). As the handle 40 begins to move, the pivot arm 46 will begin to rotate in a counterclockwise direction about fastener 52 which acts as a pivot axis (see, FIG. 3).

Figure 10:
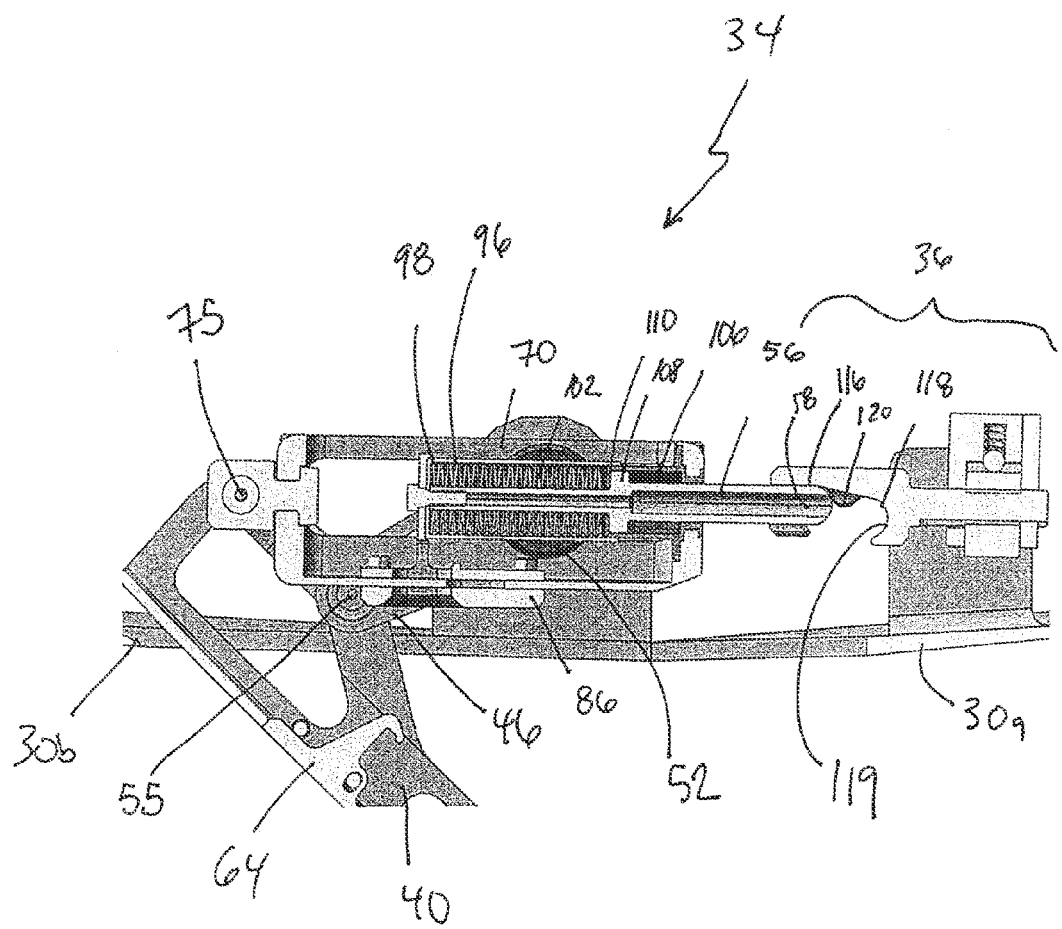
FIG. 10 is another side cutaway view of a latching system according to one or more embodiments of the present invention, the latching system continuing to be opened as compared to FIG. 8.

As will be appreciated, the actuating member 64 may return to a normal position (as shown in FIG. 10) when the post 66 completely passes through the last of either the aperture 76 of the frame 70 or the aperture 88 of the bracket 86. Preferably, the actuating member 64 is biased to the normal position with a spring 65. See, FIG. 5.

In the normal position, the actuating member 64 is preferably flush with the handle. See, FIG. 4.

Figure 9:
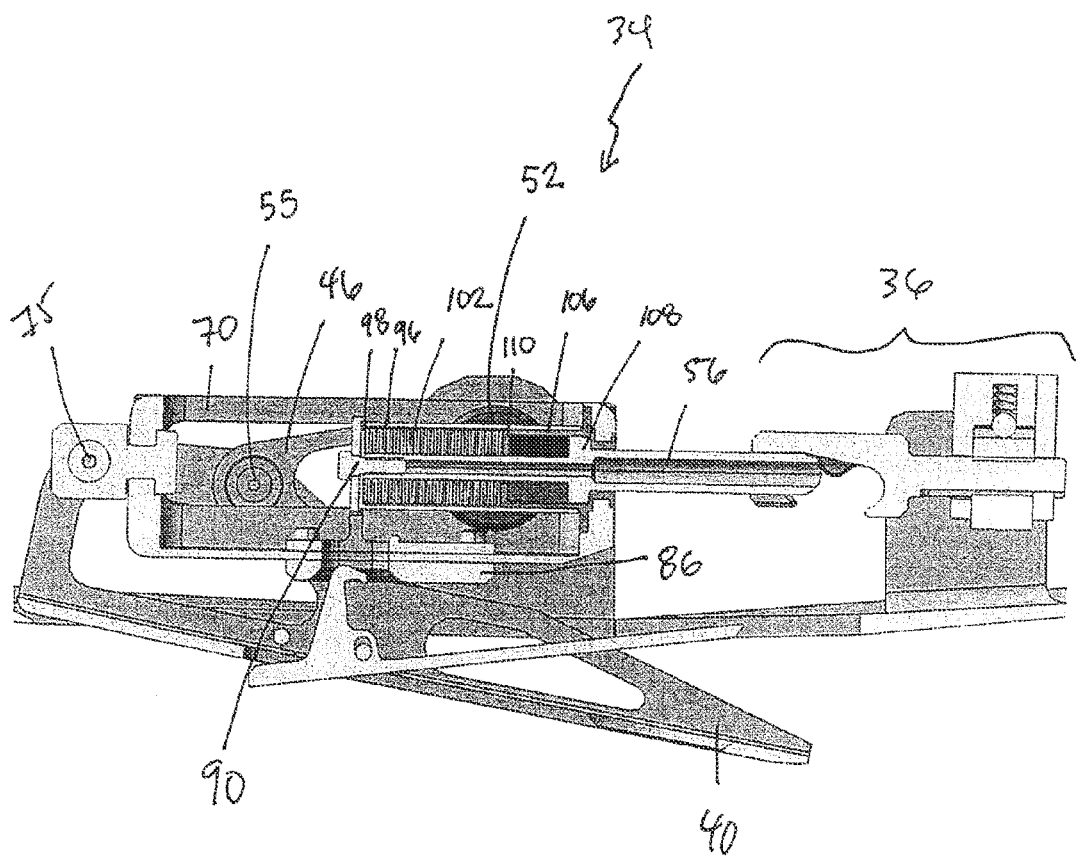
FIG. 9 is another side cutaway view of a latching system according to one or more embodiments of the present invention, the latching system shown continuing to be opened as compared to FIG. 8.

Turning to FIG. 9, the handle 40 can be rotated about the pivot axis 75 in a clockwise direction, causing the pivot arm 46 to rotate in a counterclockwise direction about the fastener 52 (see, FIG. 11) due to its pivoting connection to the handle 40 at the pivot axis 55, which is moved downward during this portion of the opening sequence.

This movement will cause the frame 70 to move in a direction to the right with respect to FIG. 9. Since the frame 70 is coupled to the housing 106, the housing 106 will also be moved in the same direction. At the same time, the gripping arm 56 will be held stationary due to its coupling with the anchor 36. Since the closed end 98 of the tube 96 is connected to the second end 90 of the gripping arm 56, the tube 96 will also be held relatively stationary. Accordingly, the biasing element 102 will begin to expand outwardly between the housing 106 and the closed end 98 of the tube 96 which are being moved apart in opposite directions. This outward expansion of the housing 106 and the closed end 98 of the tube 96 will result in the frame 70 and the bracket 86 being moved apart in opposite directions as shown in FIG. 10. Once the bottom 110 of the housing 106 has contacted the flange 108 of the gripping arm 56, the biasing element 102 will be prevented from expanding further. See, FIG. 10.

Figure 11:
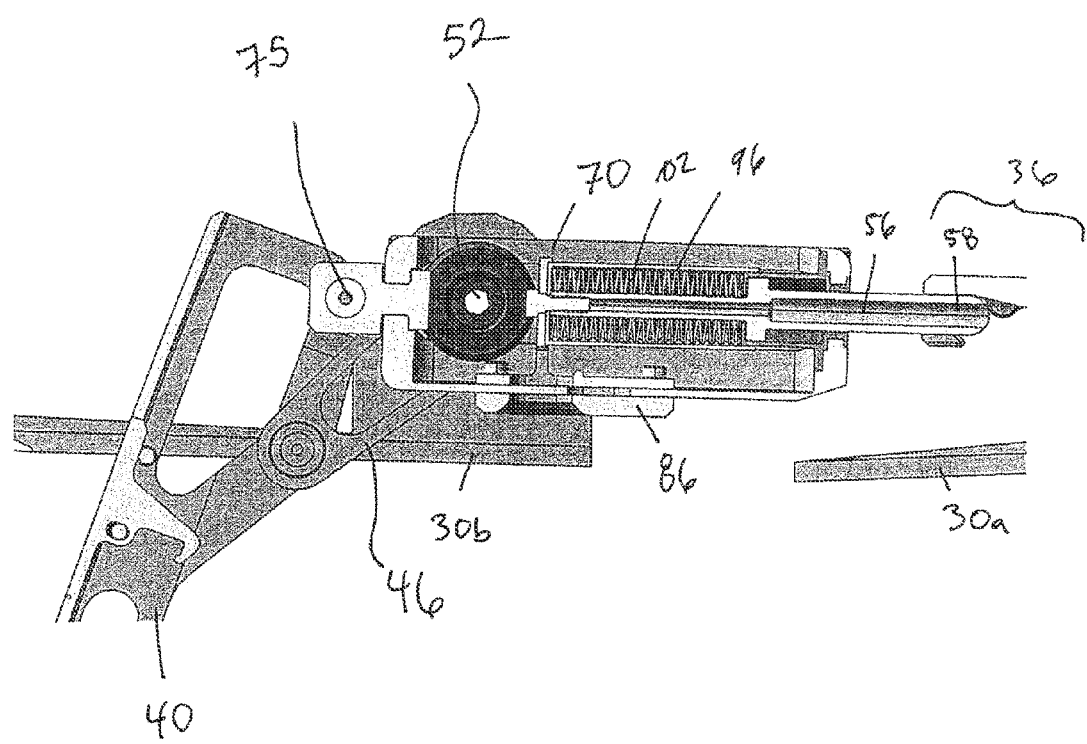
FIG. 11 is another side cutaway view of a latching system according to one or more embodiments of the present invention, the latching system shown in an open position.

At a point, as shown in FIGS. 10-11, as the frame 70 reaches the end of its movement to the right (towards the anchor 36), the pivot arm 46 will reach the end of its rotation about the fastener 52; however, the handle 40 can continue to be rotated further in a clockwise direction about the pivot axis 75. As shown in FIG. 11, continued opening of the handle 40 will result in the frame 70 and the bracket 86 both being moved in a direction toward the anchor 36 (which is mounted on the first cowl door 30a). If the cowl doors 30a, 30b are not stuck in the closed position, the cowl doors 30a, 30b will begin to separate as the gripping arm 56 is moved in a direction towards the first cowl door 30a and pressing against protrusion 120.

As shown in FIG. 11, when fully opened, in order to uncouple the portion 58 of the gripping arm 56 from the anchor 36, the handle 40 may be rotated upward around the axis of fastener 52. This rotation will move the portion 58 of the gripping arm 56 downward and will decouple the portion 58 of the gripping arm 56 from the anchor 36, allowing the cowl door 30a, 30b to be completely opened and thus providing access to the engine contained therein.

If the cowls 30a, 30b are stuck or difficult to separate, the portion 58 of the gripping arm 56 coupled to the anchor 56 will exert an increased separating force on the anchor 36 which will force the cowl doors 30a, 30b apart. A preferred embodiment of the present invention accommodates this increased separating force.

Accordingly, as shown in FIG. 10 the anchor 36 may include two parallel notches 116, 118, each configured to receive the portion 58 of the gripping arm 56. The notches 116, 118 may be separated by a protrusion 120. The front notch 116 (closer to the latch 38) is utilized when securing and closing the latching system 34. Conversely, the rear notch 118 (further from the latch 38) is utilized when separating the cowl doors 30a, 30b if the cowl doors 30a, 30b are stuck together, e.g. because of ice. The portion 58 of the gripping arm 56 is pressed against the protrusion 120, and if there is little to no resistance to the cowl doors 30a, 30b moving apart, the pressure against the protrusion 120 will result in the cowl doors 30a, 30b separating and pivoting open.

Figure 12:
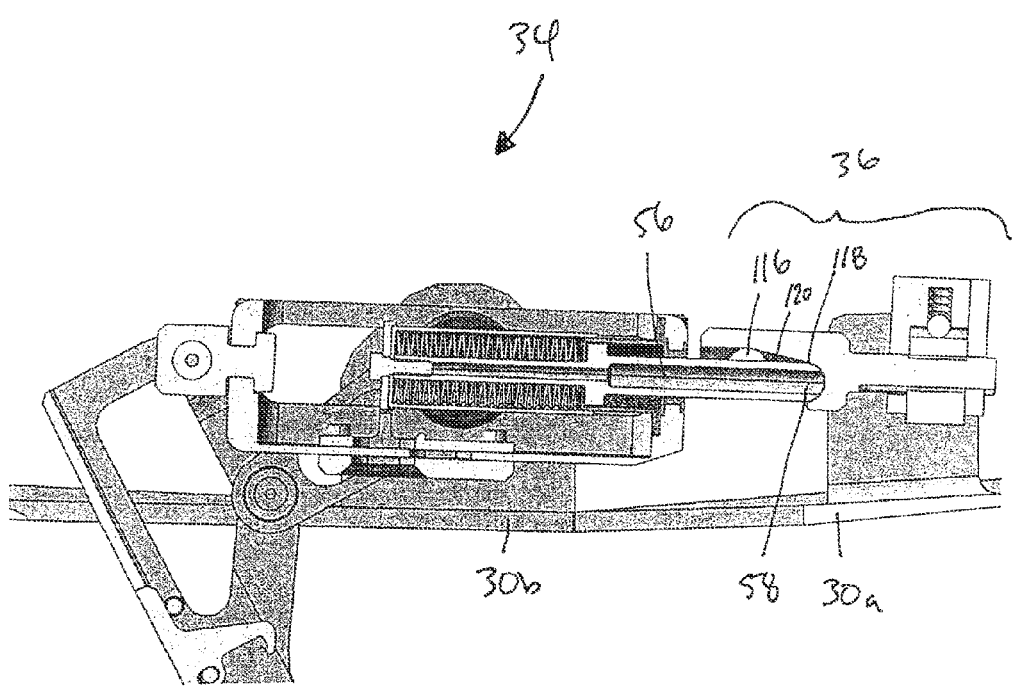
FIG. 12 is another side cutaway view of a latching system according to one or more embodiments of the present invention, wherein the latching system is shown opening when the cowl doors are stuck together.

However, if the cowl doors 30a, 30b are stuck together, as shown in FIG. 12, then the portion 58 will ride up a sloping wall of the protrusion 120 to pass the protrusion, allowing the portion 58 to enter the rear notch 118 and engage an end wall 119 of that notch 118, against which the griping arm 56 will apply a stronger opening force (see, FIG. 12). Thus, the rear notch 118 is configured to couple to the portion 58 of the gripping arm 56, only when the gripping arm 56 is exerting the increased separating force.

Figure 13:
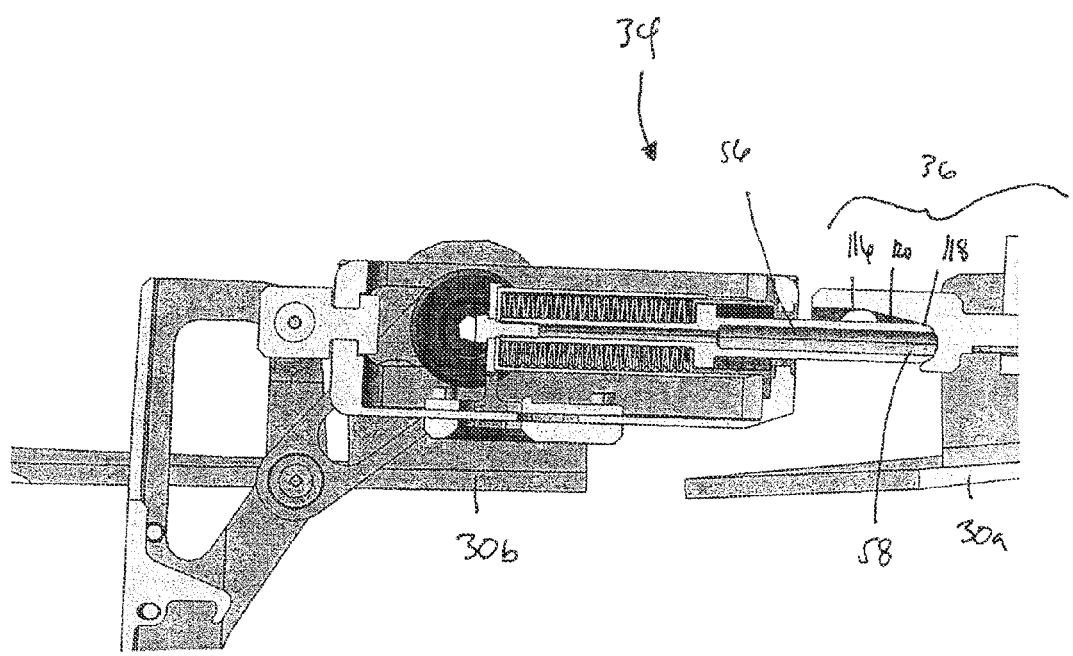
FIG. 13 is a side cutaway view of a latching system according to one or more embodiments of the present invention, the handle of the latching system shown in an open position if the cowls were stuck together.

As shown in FIGS. 12 and 13, the rear notch 118 will receive the increased separating force and communicate same to the first cowl door 30a, forcing the first cowl door 30a apart from the second cowl door 30b based upon the movement of the handle 40. Thus, no additional tools would be required when trying to decouple the two cowl doors 30a, 30b that may have become stuck together.

Figure 14:
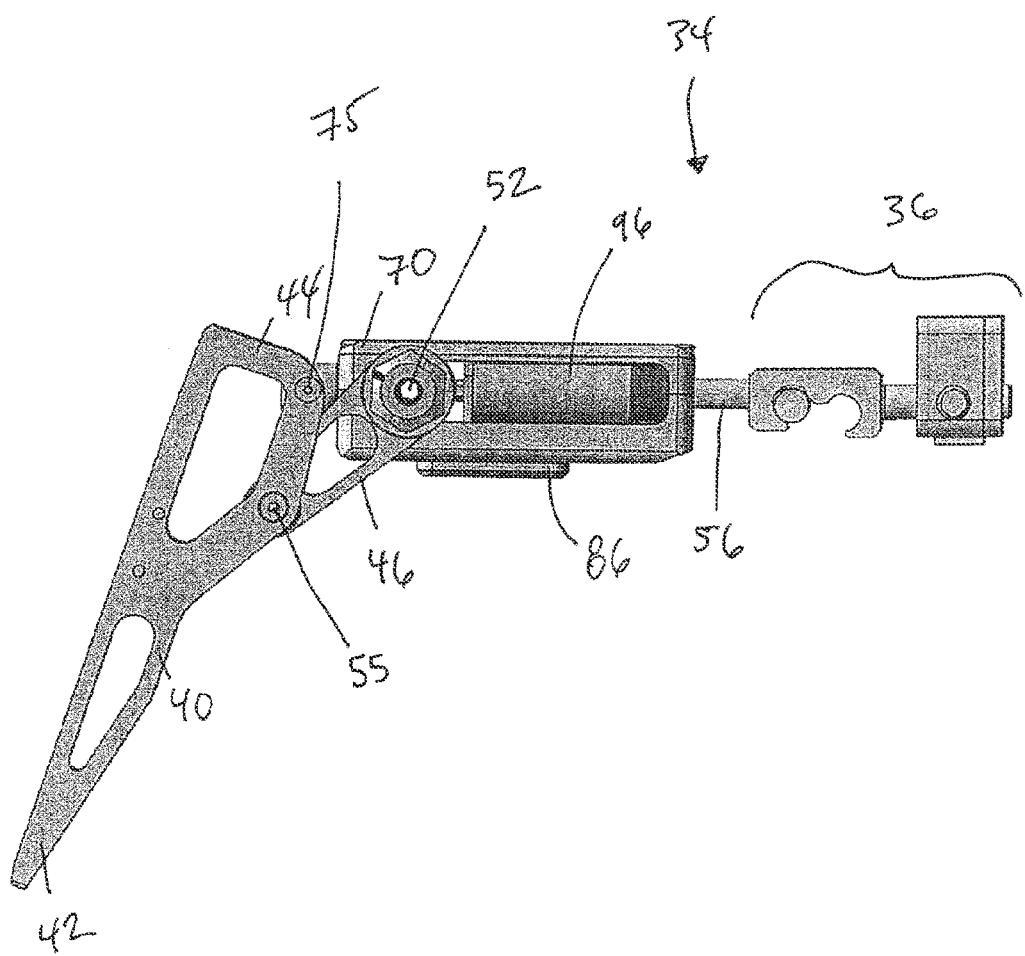
FIG. 14 is a side view of a latching system according to one or more embodiments of the present invention, the handle of the latching system shown in an open position.

Turning to FIG. 14, in order to close the latching system 34, the gripping arm 56, and more specifically the portion 58 may be manually coupled to the anchor 36. The first end 42 of the handle 40 may be rotated in a counterclockwise direction around pivot axes 75 and 55. During this initial rotation of the first end 42 of the handle 40, the pivot arm 46 will not rotate around fastener 52. Since the second end 44 of the handle 40 is secured to the frame 70 via pivot axis 75, the frame 70 will be pulled in a direction away from the anchor 36. The biasing element 102 inside of tube 96 will cause the bracket 86 and the gripping arm 56 to be pulled in the same direction (away from the anchor 36). This will pull the cowl doors 30a, 30b together and will also pull the pivot axis 55 upward.

Figure 15:
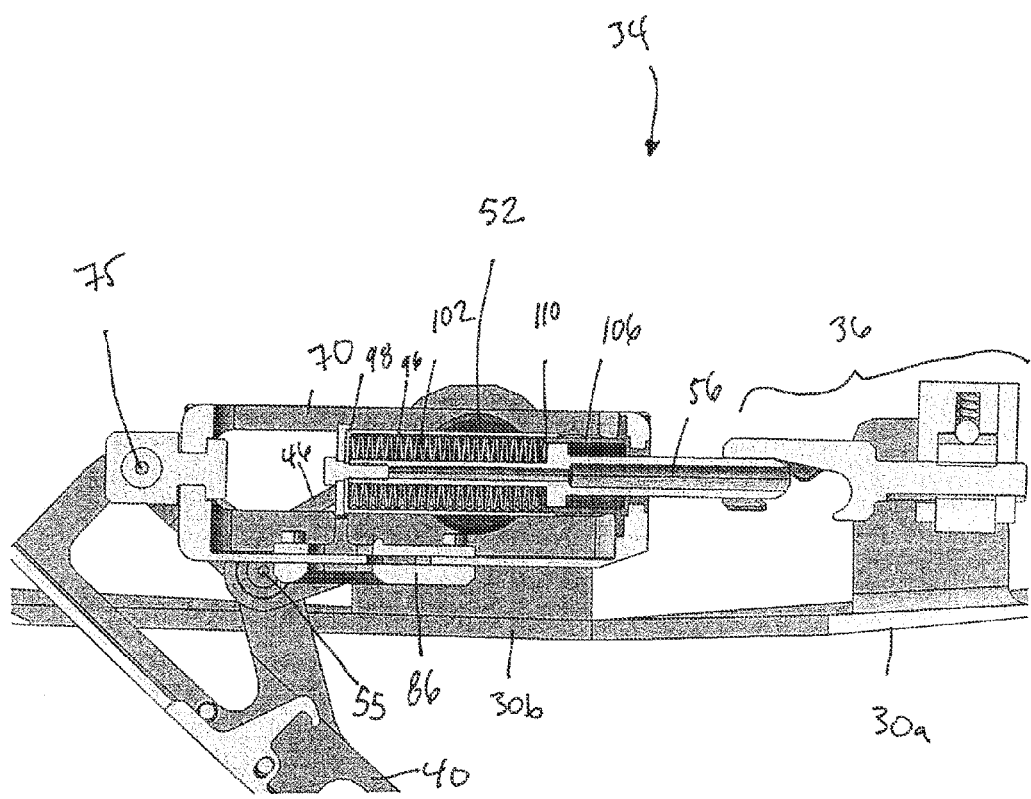
FIG. 15 is another side partial cutaway view of a latching system according to one or more embodiments of the present invention, wherein the handle is moved to the closed position as compared to FIG. 15.

Eventually, as shown in FIG. 15, open inner edges of the cowl doors 30a, 30b should contact each other. At this point, while the handle 40 is being rotated in a counterclockwise direction, the pivot arm 46 rotates clockwise about pivot axis 52 (see, FIG. 14) and the pivot axis 55 will move upward. At the same time the gripping arm 56 will be held relatively stationery due to it being secured to anchor 36. Accordingly, continued rotation of the handle 40 will result in the frame 70 being pulled in a direction away from the anchor 36 while the bracket 86 and the gripping arm 56 will remain relatively stationary relative to the anchor 36.

Since the frame 70 is moving and the bracket 86 is held relatively stationary, the frame 70 will pull the housing 106 in the same direction as the frame 70 (away from the anchor 36). This will begin compressing the biasing element 102 between the bottom 110 of the housing 106 and the closed end 98 of the tube 96.

Figure 16:
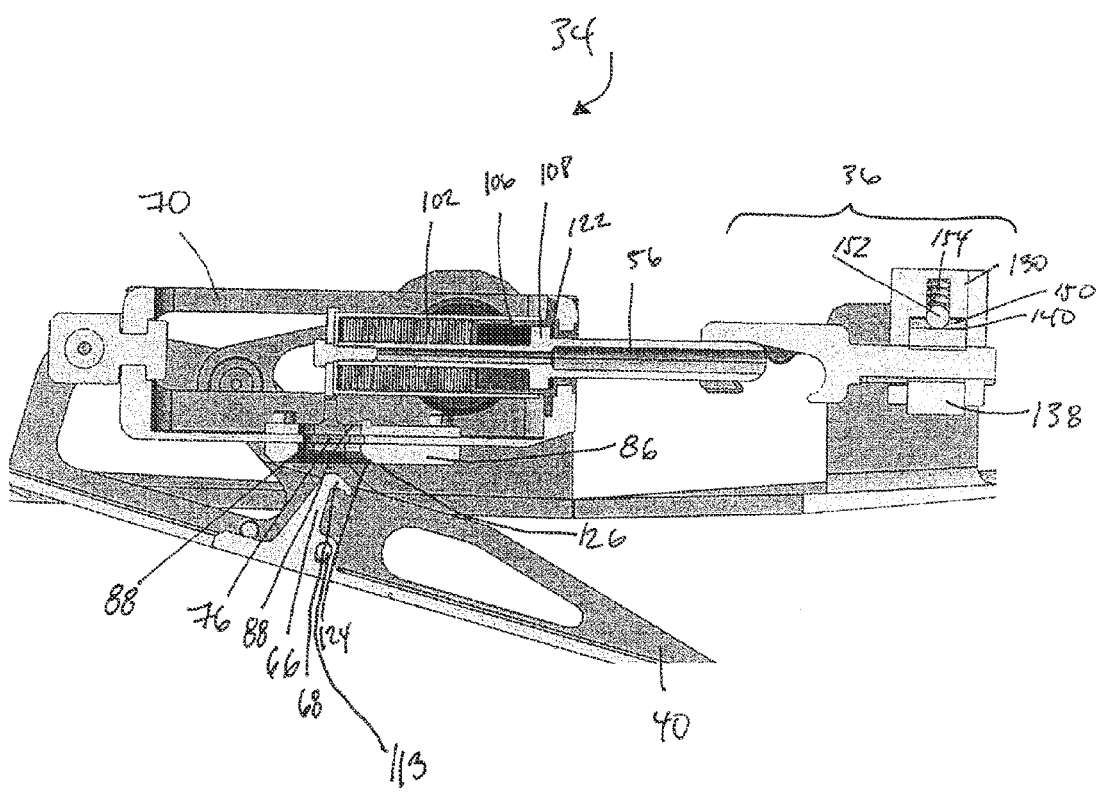
FIG. 16 is another side partial cutaway view of a latching system according to one or more embodiments of the present invention, wherein the handle is continuing to be moved to the closed position as compared to FIG. 15.

As shown in FIG. 16, eventually the flange 108 of the gripping arm 56 will contact a top 122 of the housing 106, which will act to provide the final tightening of the gripping arm 56 on the anchor 36 as the handle 40 reaches its final closed position. If the gripping arm 56 is coupled to the anchor 36, the aperture 76 of the frame 70 and the aperture 88 of the bracket 86 will have been brought into alignment—allowing the handle 40 to fully close.

If however, the gripping arm 56 is not secured to the anchor 36, the biasing element 102 will force the frame 70 to move relative to the bracket 86. As shown in FIG. 5, this will create a misalignment of the aperture 76 of the frame 70 and the aperture 88 of the bracket 86. If the apertures 76, 88 are not aligned, the post 66 of the actuating member 64 will be precluded from passing though both, and thus the interference between the post 66 and the bracket 86 will not allow the handle 40 to reach its closed position. The handle 40 will then physically protrude by hanging down underneath the cowl doors 30a, 30b providing a visual indication that the cowl doors 30a, 30b are not secured and are not in the closed and latched position.

As shown in FIG. 16, if however, the gripping arm 56 is coupled to the anchor 36, the aperture 76 of the frame 70 and the aperture 88 of the bracket 86 will be aligned—allowing the handle 40 to fully close into a flush position relative to the cowl doors 30a, 30b. See, FIG. 2.

In embodiments in which it is desirable to lock the handle 40 in the closed position, the head 68 of the post 66 of the actuating member 64 may contact a ramp 124 on bottom outer surface 126 of the bracket 86. See, FIG. 16. The ramp 124 will force the head 68 in a direction, causing the actuating member 64 to pivot about the post 113 and allowing the post 66 to pass through the aperture 76 of the frame 70 and the aperture 88 of the bracket 86. Once the head 68 of the post 66 of the actuating member 64 has passed through the apertures 76, 88, the actuating member 64 can be moved into a locked position with the head 68 of the post 66 engaging the protrusion 94 on the bracket 86. See, FIG. 7. Again, the actuating member 64 is preferably biased with the spring 65 so as to automatically lock the handle 40. See, FIG. 5. Furthermore, if the handle 40 is not locked (and in a fully closed position), the handle 40 may automatically open allowing a good visibility (a special paint may be also used) showing that the handle 40 is not fully closed.

As shown in FIG. 7, the latching system 34 has coupled the cowl doors 30a, 30b, secured the cowl doors 30a, 30b in a closed position, and is locked in the closed position.

In certain embodiments, it may be necessary to allow for some adjustment to the force necessary to overcome the force exerted by the biasing element 102.

Therefore, in a preferred embodiment, as shown in FIGS. 4 and 8, the anchor 36 includes a keeper 128 and a mounting 130 which are preferably secured to each other with a shaft 132. The shaft 132 may be integral with the keeper 128 or the mounting 130. Alternatively, it is contemplated that the shaft 132 is a separate component. The mounting 130 may be attached to the first cowl door 30a with two brackets 134 each receiving a post 136. The mounting 130 may be pivotable around the posts 136. As will be appreciated, each side of the mounting 130 may include a post 136, one for each bracket 134 on each side of the mounting 130.

Figure 17:
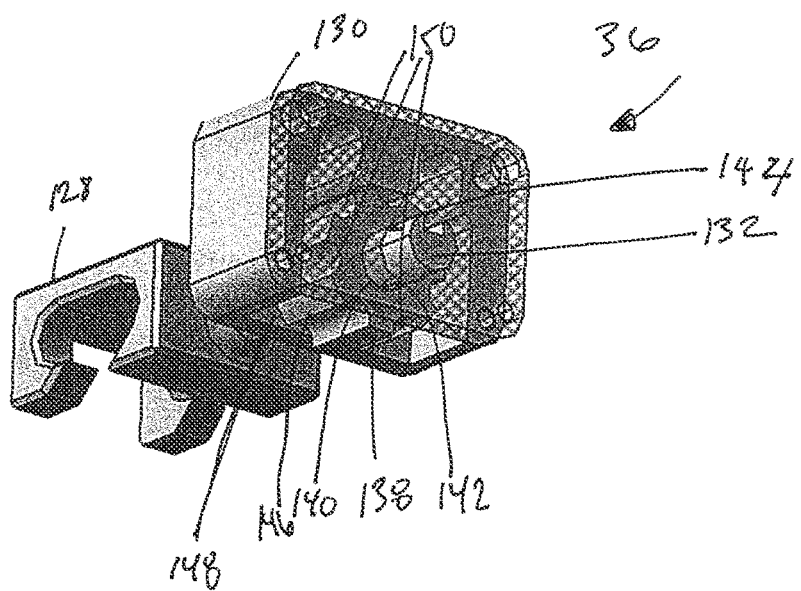
FIG. 17 is a rear partial cutaway view of an anchor used with a latching system according to one or more embodiments of the present invention.
Figure 18:
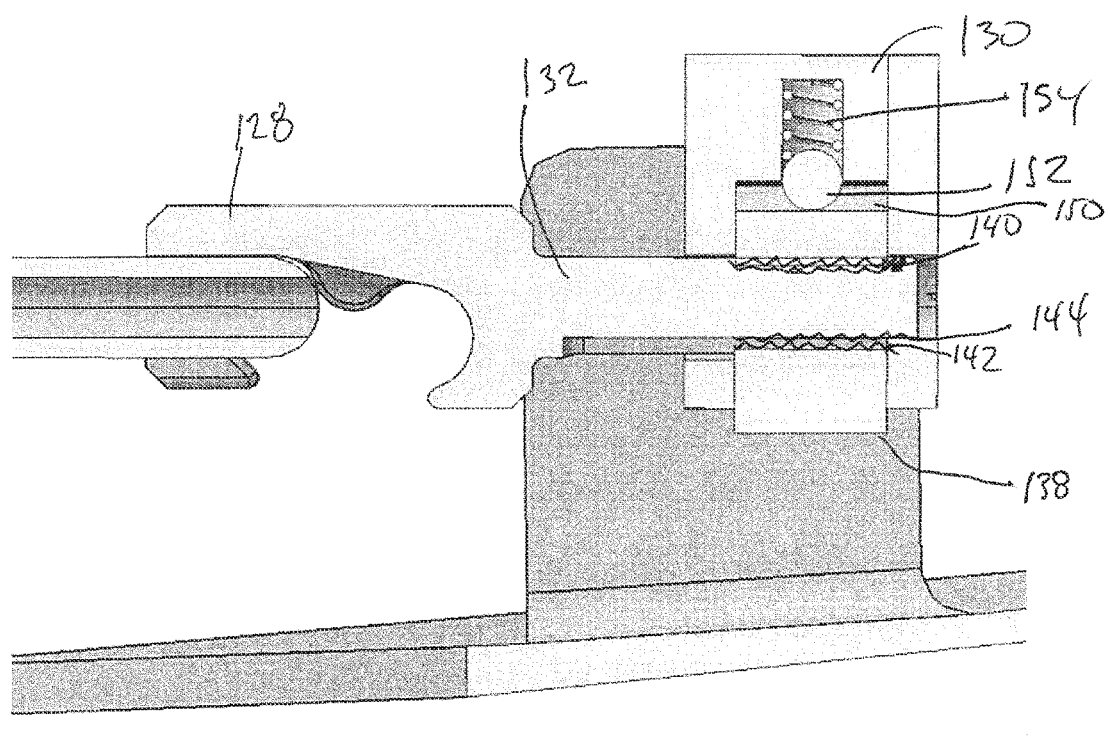
FIG. 18 is a side cutaway view of an anchor used with a latching system according to one or more embodiments of the present invention.

As shown in FIGS. 17 and 18, a distance between the mounting 130 and the keeper 128 along an axis of the shaft 132 can be adjusted with an adjustment mechanism 138.

A preferred adjustment mechanism 138 includes an aperture 140 having a threaded outer surface 142. The shaft 132 preferably includes a threaded portion 144 which is received in the aperture 140 of the adjustment mechanism 138. The threaded outer surface 142 of the aperture 140 is configured complementary to the threaded portion 144 of the shaft 132. In use, a user can access a portion of an outer surface 146 of adjustment mechanism 138 through a slot 148 on the mounting 130. This allows a user to rotate the adjustment mechanism 138.

In a most preferred embodiment, the outer surface 146 of the adjustment mechanism 138 includes a plurality of parallel spaced grooves 150. As shown in FIG. 16, the mounting 130 may contain a ball 152 and a biasing element 154 to bias the ball 152 into the groove 150 on the outer surface 146 of the adjustment mechanism 138. The ball 152 and the biasing element 154 will prevent adjustment mechanism 138 from rotating without being acted upon.

Again, such an anchor 36 may be desirable, for example, to adjust the distance between the latch 38 and the anchor 36 to provide the appropriate distance between same to ensure that the latching system 34 will only fully close, when the cowl doors 30a, 30b are secured.

It is to be understood that additional embodiments of the present invention described herein may be contemplated by one of ordinary skill in the art and that the scope of the present invention is not limited to the embodiments disclosed. While specific embodiments of the present invention have been illustrated and described, numerous modifications come to mind without significantly departing from the spirit of the invention and properly come within the scope of my contribution to the art.

The invention claimed is:

1. A latching system for selectively securing a first component with a second component, the latching system comprising:
   an anchor configured to be secured to the first component; and,
   a latch configured to be secured to the second component, the latch including a frame and a handle secured to the frame, the handle configured to be rotated from a closed position to an open position, and the latch further including a gripping arm having a first end configured to couple to the anchor to secure the latch to the anchor and a second end slideably received in the frame, and
   wherein the handle further comprises a post and the frame further comprises an aperture configured to receive the post only if the latch is secured to the anchor and wherein the aperture and post are configured to preclude the handle from being moved to the closed position when the latch is not secured to the anchor.

2. The latching system of claim 1 further comprising:
   a biasing element configured to exert a force on the gripping arm away from the anchor, and
   wherein the handle is further only movable to the closed position when additionally a force exerted by the biasing element is overcome.

3. The latching system of claim 1 wherein the frame comprises
   a first aperture, a first end, and a second end, the first end of the frame pivotably connected to a first end of the handle, and the second end of the frame slidably receiving the gripping arm of the latch; and, wherein the latching system further comprises
   an actuating member disposed in the handle and including the post.

4. The latching system of claim 1 wherein the post of the actuating member includes a head configured to selectively lock the handle in the closed position.

5. The latching system of claim 3 further comprising:
   a bracket secured to the second end of the gripping arm, the bracket including a second aperture,
   wherein the post is configured to extend through the first aperture of the frame and the second aperture of the bracket only if the first aperture of the frame and the second aperture of the bracket are aligned, and wherein the first aperture of the frame and the second aperture of the bracket are configured to be aligned while the handle is moving to the closed position only when the gripping arm of the latch is secured to the anchor.

6. The latching system of claim 5 wherein the first aperture of the frame and the second aperture of the bracket are biased to be misaligned.

7. The latching system of claim 5 further comprising:
   a biasing element arranged to bias the first aperture of the frame and the second aperture of the bracket in misalignment.

8. The latching system of claim 7 wherein the biasing element is selected from the group consisting of: a conical spring washer, a compression spring, a compressed gas, an elastomer part, and a hydraulic piston.

9. The latching system of claim 7 further comprising:
   a tube having a closed end and an open end, the closed end of the tube secured to the bracket, the open end of the tube containing a housing, the housing secured to the second end of the frame.

10. The latching system of claim 9 wherein the gripping arm of the latch further includes a flange, and wherein the flange of the gripping arm of the latch is disposed within the housing.

11. The latching system of claim 10 wherein the biasing element is disposed within the tube between the closed end of the tube and the housing.

12. The latching system of claim 1 wherein the anchor comprises:
   a keeper configured to couple to the first end of the gripping arm of the latch; and,
   a mounting for securing the anchor to the first component.

13. The latching system of claim 12 further comprising a shaft securing the keeper of the anchor to the mounting of the anchor.

14. The latching system of claim 13 wherein a distance between the keeper of the anchor and the mounting of the anchor in a direction along an axis of the shaft is selectively adjustable.

15. The latching system of claim 14 further comprising:
   an adjustment mechanism for adjusting a distance between the keeper of the anchor and the mounting of the anchor in a direction along an axis of the shaft.

16. The latching system of claim 15 wherein the adjustment mechanism includes an aperture having a threaded outer surface configured complementarily to a threaded portion of the shaft.

17. The latching system of claim 1 wherein the anchor includes a first notched portion and a second notched portion, and
   wherein the first notched portion of the anchor is configured to couple to the first end of the gripping arm of the latch when the handle is being moved to the closed position, and
   wherein the second notched portion of the anchor is configured to couple to the first end of the gripping arm of the latch only when the handle is being moved to the open position.

18. A latching system for selectively securing a first component with a second component, the latching system comprising:
   an anchor secured to the first component; and,
   a latch secured to the second component, the latch including a handle moveable from a closed position to an open position, and the latch further including a gripping arm having a first end configured to couple to the anchor to secure the latch to the anchor,
   wherein the anchor includes a first notched portion configured to couple to the first end of the gripping arm of the latch when the handle is being moved to the closed position to transmit a closing force from the gripping arm to the anchor in a closing direction, and, wherein anchor includes a second notched portion configured to couple to the first end of the gripping arm of the latch only when the handle is being moved to the open position to transmit an opening force from the gripping arm to the anchor in an opening direction, oppositely orientated from the closing direction.

* * * * *